United States Patent [19]

Gebauer

[11] Patent Number: 4,944,819

[45] Date of Patent: Jul. 31, 1990

[54] USE OF 2-COMPONENT REACTION RESINS FOR FASTENING PURPOSES

[75] Inventor: Ludwig Gebauer, Olching, Fed. Rep. of Germany

[73] Assignee: Hilti Aktiengesellschaft, Fürstentum, Liechtenstein

[21] Appl. No.: 337,734

[22] Filed: Apr. 13, 1989

[30] Foreign Application Priority Data

Apr. 16, 1988 [DE] Fed. Rep. of Germany ....... 3812814

[51] Int. Cl.$^5$ .......................... B32B 31/14; B32B 5/20
[52] U.S. Cl. .......................................... 156/78; 156/79; 156/294; 156/332; 405/260; 405/261; 405/264
[58] Field of Search ....................... 156/77, 78, 79, 91, 156/92, 294, 332; 166/295; 405/261, 264, 259, 260

[56] References Cited

U.S. PATENT DOCUMENTS 4,402,633  9/1983  Self ...................................... 405/261

*Primary Examiner*—Robert A. Dawson
*Attorney, Agent, or Firm*—Toren, McGeady & Associates

[57] ABSTRACT

A foamable, 2-component mortar composition is used to fix tie bars and similar anchoring means in boreholes, especially in hollow checker firebrick. The mortar composition is composed of a reactive resin, a curing agent component, as well as a foaming agent. The volume of the mortar composition required for the anchoring can be reduced significantly with the inventive composition. This is particularly important for anchorings which cross hollow checker firebrick.

4 Claims, No Drawings

USE OF 2-COMPONENT REACTION RESINS FOR FASTENING PURPOSES

BACKGROUND OF THE INVENTION

This invention concerns a method for fastening anchoring means in boreholes, and more particularly, this invention is directed to the use of a mortar composed of foamable, 2-component, reactive resin composition to fix anchoring means such as a tie bar in boreholes.

The use of 2-component reactive resins as fastening agents, for example, to fix tie bars in boreholes, is well known. Generally, 2-chamber cartridges are used for this purpose; the walls of the cartridge consist of material that can easily be destroyed, or double cartridges with a static mixer are used. In one case, the mixing of the two components, which is required for curing, takes place with the help of the anchoring means by mixing the cartridge contents after destruction of the cartridge walls or by mixing the two components in the static mixer and using the mixture so obtained for the particular fixing purpose. The use of reactive resin compositions for such purposes as the fixing means in hollow checker firebrick, in punched boreholes or in cleaved materials makes it necessary to employ considerable quantities of resin composition. As a consequence, the consumption of raw material is high and the manufacture, packaging, transport and storage are correspondingly expensive. At times, several 2-chamber cartridges are required for one fixing process, or only a few points of attachment can be produced with one double cartridge.

SUMMARY OF THE INVENTION

It is an object of the present invention to avoid the foregoing disadvantages.

Another object of the invention is to ensure that a higher number of points of attachment can be produced with comparatively lesser amounts of reactive resin mortar composition without any loss in the quality of the attachment.

These and other objectives are accomplished by the invention, according to which, it has been found that anchoring means such as tie bars and the like may be fixed in boreholes by use of a foamable, free radical curable, 2-component reactive resin composition.

DETAILED DESCRIPTION OF THE INVENTION

Due to foaming of the free radical curable reactive resins at the site of use, it is possible to avoid the useless spread of reactive resins into cavities, crevasses, etc. Fully satisfactory attachments are achievable, on one hand, because of the good strength of the resultant resin foams and, on the other, because of the production of a form-fitting shape under the pressure of the foaming agent.

As reactive resins, the usual, well known, free radical curable resins can be used, such as unsaturated polyester resins with reactive diluents, such as styrene, vinyl esters, notably the reaction products of bisphenols and novolak with unsaturated carboxylic acids, such as acrylic acid, especially dissolved in reactive diluents, such as styrene, other acrylate resins, etc. Vinyl ester resin and also mixtures of vinyl ester resin and unsaturated polyester resin are preferred.

The usual peroxide compounds, such as dibenzoyl peroxide, cumoyl peroxide and similar compounds can be used as the curing agent for the free radical curable reactive resins. The peroxides are customarily contained in organic desensitizing agents, especially phthalic esters, generally in amounts of about 40 to about 60% by weight. The use of a peroxide curing agent in an organic desensitizing agent is preferred.

The foaming agents contained in the foamable, free radical curable, 2-component resin compositions, used according to the invention, may be low-boiling halogenated hydrocarbons, especially fluorinated hydrocarbons, which become volatile under the exothermic curing conditions and thus develop a blowing agent effect. Within the scope of the present invention, those mortar compositions are preferred which contain as foaming agent a combination of inorganic carbonates and carboxylic acids, especially polycarboxylic acids. Before the reactive resin is mixed with the curing agent, the inorganic carbonate and the polycarboxylic acid are kept separate from one another, the carbonate being contained in the one component of the 2-component system and the organic carboxylic acid in the other. However, the foaming combination of carbonate and carboxylic acid may also be contained in one of the two components of the 2-component system, for example, as a dry mixture. Foaming is then initiated by mixing with the other component of the 2-component system, for example, with addition of water.

The carboxylic acids must have a pH sufficient under the conditions of mixing to release carbon dioxide, which acts as a foaming agent, from the carbonate. As inorganic carbonates, those carbonates are preferred which are easily decomposed while giving off carbon dioxide, especially the carbonates of multivalent compounds. Carboxylic acids which form a component of the foaming agents include polyacrylic acids and their derivatives, such as polymethacrylic acid, copolymers of acrylic acid and/or methacrylic acid with itaconic acid and/or maleic or fumaric acid and/or acrolein. Preferred are carboxylic acids which are polymerizable or copolymerizable themselves, and also carboxymethyl-cellulose (acid form), alkyl and acryl polycarboxylic acids, etc. As inorganic carbonates, especially the carbonates of multivalent metals, such as calcium carbonate (chalk, calcite), magnesium carbonate, magnesium hydroxy carbonate, calcium magnesium carbonate (dolomite), zinc carbonate, zinc hydroxy carbonate, etc. have proven their value. The use of carbonates of multivalent metals has the advantage that, after the carbonate is decomposed by the organic carboxylic acid with release of carbon dioxide, the remaining metal ions form carboxylate groups with the carboxylic acid groups of the organic carboxylic acids; the compounds thus formed lead to cross linking and thereby, to an increase in the strength of the cured mortar.

The reactive resins generally are present together with reactive compounds containing vinyl groups, especially with those compounds, which at the same time act as solvents, such as styrene or similar reaction diluents. This is the case particularly for unsaturated polyester resins and vinyl ester resins, which are generally contained in such reactive diluents in amounts of 40 to 60% by weight. In the following, the quantitative data relating to reactive resins is based on the mixtures, in the usual manner; in those cases where such vinyl components, in addition to the actual reactive resin, are unwanted or unnecessary, as in the case of the acrylate resins, the quantitative data is based on the resins as such.

The mortar compositions, used pursuant to the invention, may contain fillers such as staple fibers, short glass fibers, glass flakes, quartz sand, quartz powder, glass fly ash spheres, hollow glass fly ash spheres, etc. When such hollow spheres are used, the mortar compositions have excellent strength properties, in spite of a low specific gravity.

Moreover, thixotropic agents may be included in the composition, such as pyrogenic silica which has optionally been treated with an organic material, bentonites, methylcelluloses and castor oil derivatives, pyrogenic silica generally being preferred.

The presence of surface active substances has proven to be advantageous. On one hand, the surface active agents facilitate the homogeneous miscibility of the two components of the 2-component system and frequently stabilize the foam until the reactive resin components gel and on the other hand, they exert a wetting effect on the absorbing material, as well as on the anchoring material, such as tie bars and the like. Oil-in-water emulsifiers have proven to be especially useful. As foam stabilizers, particularly compounds based on polysiloxanes can be used.

The mortar compositions used according to the invention may contain organic or inorganic solvents, especially water and the like. Moreover, the use of accelerators, especially amine accelerators, has been found to be advantageous, as has the use of stabilizers such as quinones and hydroquinones. In addition to or instead of fillers, inorganic or organic extender, such as those of a mineral nature, finely divided grit, stone dust and the like may also be included.

After the two components are mixed, two reactions take place independently of one another, namely the free radical polymerization of the reactive resins and a foaming reaction. The free radical polymerization is initiated in the usual manner by the peroxide curing system, which optionally contains accelerators. The curing time can be controlled in the manner known in the art, by the nature and amount of the peroxides and the accelerators, such as amine accelerators, and by inhibitors such as t-butyl pyrocatechin.

At the same time as polymerization proceeds, the foaming reaction takes place, for example, by the evaporation of low boiling fluorinated hydrocarbons or by the reaction of carboxylic acids with inorganic carbonate with the release of gaseous carbon dioxide. The rate of foam formation can be controlled by the nature and amount of the particular blowing agent used, for example, by the nature, amount and particle size of the carbonate, and by the nature and amount of the carboxylic acids, particularly by the pH and by the amount of water.

It has proven to be expedient for the foaming reaction to be essentially completed before the gelling phase or while the polymerization reaction is still in the initial gelling phase. The foam expansion ratio can be controlled arbitrarily; values ranging from 1:1.5 to 1.7 especially have been found to be advantageous.

The basic formulation as well as the two examples which follow are intended to further illustrate the best mode currently contemplated for carrying out the invention, but are not to be construed as limiting the invention in any manner. All percentages are by weight based on the total formulation, unless otherwise noted.

Basic Formulation

Component A:
  reactive resin: 40–80%
  inorganic carbonate: 5–50%
  filler: 5–50%
  thixotropic agent: 1–7%
  surface active substances (emulsifier, foam stabilizer): 0–3%
Component B:
  dibenzoyl peroxide: 0.5–4% (*)
  polymeric carboxylic acid: 1–10%
  water: 2–10%
  thixotropic agent: 0.1–1%
  surface active substance(s) (emulsifier, foam stabilizer) 0–1%
  filler: 0–10%

(*) Based on 100% dibenzoyl peroxide. If peroxide preparations, formulated with organic desensitizing agents such as phthalate esters are used, the overall formulation additionally contains 0.5–5% of the desensitizing agent.

EXAMPLE 1

Component A:
  unsaturated polyester resin, amine accelerated, 35% styrene content: 47.5%
  1600 mesh quartz powder: 26.0%
  short, 0.3 mm long, glass fibers: 4.0%
  hollow fly ash spheres with an average particle diameter of 0.12 mm, bulk density of 410 kg/m3: 10.0%
  calcium carbonate (calcite) with a particle diameter of 5 microns: 10.0%
  pyrogenic silica: 2.5%
Component B:
  dibenzoyl peroxide, 50% in phthalate ester: 28.0%
  polyacrylic acid: 22.5%
  water: 29.5%
  hollow fly ash spheres: 15.0%
  pyrogenic silica: 5.0%
mixing ratio: 1 part by weight of component B to 9 parts by weight of A
rise time: 4 minutes
volume increase: 2.5 fold (free foaming)
gel time: 5 minutes
curing time: 1 hour

EXAMPLE 2

Component A:
  unsaturated polyester resin, amine accelerated, styrene content of 30%: 56.4%
  siloxane-glycol copolymer (foam stabilizer): 0.6%
  1600 mesh quartz powder: 6.0%
  short glass fibers: 4.0%
  calcium carbonate (chalk) particle diameter of 1 micron: 30.0%
  pyrogenic silica: 3.0%
Component B
  50% dibenzoyl peroxide in chloroparaffin: 20.0%
  polyacrylic acid: 40.0%
  water: 24.0%
  1600 mesh quartz powder: 10.0%
  pyrogenic silica: 6.0%
mixing ratio: 1 part by weight of component B to 7 parts by weight of A
rise time: 6 minutes
volume increase: 5 fold (free foaming)
gel time: 8 minutes
curing time: 1.5 hours The formulations of both examples are suitable for processing from normal double cartridges with static mixers in a volume ratio of component A to component B of 7:1. They can be used for anchoring in hollow checker firebrick in conjunction with conventional, commercial threaded rods, threaded bushings and screens.

The following is an example of an anchoring in hollow checker firebrick with the formulation of Example 1.

EXAMPLE 3

A borehole with a diameter of 16 mm. and a depth of 90 mm. is prepared. A screen with a diameter of 15 mm. and a length of 80 mm. and consisting of wire mesh with a wire thickness of 0.5 mm. and a mesh width of 1 mm. is introduced into this borehole. Into the screen, 15 cc. of mortar composition are injected and subsequently an M 12 threaded rod is inserted. Due to the foaming and curing of the mortar composition, a form-fitting anchorage is produced in the substratum formed from the hollow checker firebrick.

For an anchorage similar to that of this example, but with the previously known nonfoaming mortar composition, a volume of at least 30 cc. mortar composition would be required.

I claim:

1. A method for fixing anchoring means, such as a tie bar, in a borehole comprising using mortar which is a foamable, free radical curable 2-component reactive resin composition to fix said anchoring means to said borehole, said composition containing about 35 to 85% by weight of reactive resin, about 0.1 to 5% by weight of peroxide curing agent and about 2.5 to 62% by weight of foaming agent, each % by weight being based on the total weight of the mortar composition.

2. A method for fixing anchoring means, such as a tie bar, in a borehole comprising using mortar which is a foamable, free radical curable, 2-component reactive resin composition to fix said anchoring means to said borehole, said composition comprising 40 to 80% by weight of reactive resin, 0.5 to 4% by weight of peroxide curing agent and 5 to 60% by weight of foaming agent, each % by weight being based on the total weight of the mortar composition.

3. A method for fixing anchoring means, such as a tie bar, in a borehole comprising using mortar which is a foamable, free radical curable, 2-component reactive resin composition to fix said anchoring means to said borehole, said composition containing a foaming agent comprised of inorganic carbonate and polycarboxylic acid.

4. A method for fixing anchoring means, such as a tie bar, in a borehole comprising using mortar which is a foamable, free radical curable, 2-component reactive resin composition to fix said anchoring means to said borehole, said composition containing a foaming agent comprised of inorganic carbonate in an amount of about 5 to 50% by weight and polycarboxylic acid in the amount of about 1 to 10% by weight, each % being based on the total mortar composition.

* * * * *